(12) United States Patent
Lim et al.

(10) Patent No.: US 10,259,450 B1
(45) Date of Patent: Apr. 16, 2019

(54) APPARATUS FOR CORRECTING OFFSET OF RESOLVER OF ENVIRONMENT-FRIENDLY VEHICLE, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventors: Jae Sang Lim, Suwon-si (KR); Young Un Kim, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 15/833,970

(22) Filed: Dec. 6, 2017

(30) Foreign Application Priority Data

Oct. 16, 2017 (KR) .................. 10-2017-0134079

(51) Int. Cl.
| | |
|---|---|
| *H02P 6/06* | (2006.01) |
| *H02P 21/06* | (2016.01) |
| *H02P 6/17* | (2016.01) |
| *B60W 20/50* | (2016.01) |
| *H02P 27/08* | (2006.01) |
| *H02P 6/15* | (2016.01) |
| *H02P 6/04* | (2016.01) |

(52) U.S. Cl.
CPC ............... *B60W 20/50* (2013.01); *H02P 6/04* (2013.01); *H02P 6/06* (2013.01); *H02P 6/153* (2016.02); *H02P 6/17* (2016.02); *H02P 21/06* (2013.01); *H02P 27/085* (2013.01); *B60W 2510/0208* (2013.01); *B60W 2510/082* (2013.01); *Y10S 903/903* (2013.01)

(58) Field of Classification Search
CPC ...... H02P 6/06; H03M 7/6041; H03M 7/6011
USPC .................................................. 318/602, 605
See application file for complete search history.

(56) References Cited

U.S. PATENT DOCUMENTS

| 7,340,370 | B2* | 3/2008 | Kawaguchi | G01D 5/2046 340/672 |
|---|---|---|---|---|
| 8,686,671 | B2* | 4/2014 | Jeon | B60L 11/18 318/400.01 |
| 9,007,010 | B2* | 4/2015 | Kwon | H02P 21/18 318/605 |
| 9,484,851 | B2* | 11/2016 | Bang | H02P 21/14 |
| 9,882,516 | B2* | 1/2018 | Park | H02P 21/22 |
| 2018/0095131 | A1* | 4/2018 | Cha | G01R 31/34 |

* cited by examiner

*Primary Examiner* — Bentsu Ro
(74) *Attorney, Agent, or Firm* — Knobbe Martens Olson & Bear LLP

(57) ABSTRACT

The present disclosure relates to an apparatus for correcting an offset of a resolver of an environment-friendly vehicle. The apparatus includes a resolver offset correcting error determining unit configured to determine whether a resolver offset correction error occurs, by determining whether an engine clutch is released and a torque command of a motor. The apparatus further includes a motor speed change value calculating unit configured to calculate a change value of a speed of the motor when it is determined that the resolver offset correction error occurs and a controller configured to extract a resolver offset change value by using a resolve offset change value table for the change value of the speed of the motor.

20 Claims, 19 Drawing Sheets

APPARATUS FOR CORRECTING OFFSET OF RESOLVER OF ENVIRONMENT-FRIENDLY VEHICLE, SYSTEM INCLUDING THE SAME, AND METHOD THEREOF

CROSS-REFERENCE TO RELATED APPLICATION

This application is based on and claims the benefit of priority to Korean Patent Application No. 10-2017-0134079, filed on Oct. 16, 2017, in the Korean Intellectual Property Office, the disclosure of which is incorporated herein in its entirety by reference.

FIELD

The present disclosure relates to an apparatus for correcting an offset of a resolver of an environment-friendly vehicle, a system including the same, and a method thereof, and more particularly, to a technology of correcting an offset correction error of a resolver again.

BACKGROUND

An environment-friendly vehicle, such as an electric vehicle, a hybrid vehicle, or a fuel cell vehicle, employs a motor for driving, and includes a resolver (a location sensor) for detecting a rotational location of the motor.

Because the environment-friendly vehicle may generate an offset that is a difference between a measured location of the motor and an actual location of the motor of the resolver through a current command, correction for minimizing the offset of the resolver is performed.

The disclosure of this section is to provide background of the invention. Applicant notes that this section may contain information available before this application. However, by providing this section, Applicant does not admit that any information contained in this section constitutes prior art.

SUMMARY

Even after a correction of resolver offset for a wheel-driving motor in a hybrid vehicle is performed, an offset between an actual position of the motor and a measured position of the motor may still exist due to noise. Such error may damage the motor when an engine clutch is released for a brake operation or a shift from a driving-gear to a neutral-gear.

The present disclosure is conceived to solve the above-described problems of the related art, and the present disclosure provides an apparatus for correcting an offset of a resolver of an environment-friendly vehicle, a system including the same, and a method thereof, in which divergence of a speed of a motor may be prevented by detecting an offset correction error of the resolver in real time and correcting the offset of the resolver again.

The technical objects of the present disclosure are not limited to the above-mentioned one, and the other unmentioned technical objects will become apparent to those skilled in the art from the following description.

In accordance with an aspect of the present disclosure, there is provided an apparatus for correcting an offset of a resolver, the apparatus including a resolver offset correcting error determining unit configured to determine whether a resolver offset correction error occurs, by determining whether an engine clutch is released and a torque command of a motor, a motor speed change value calculating unit configured to, if it is determined that the resolver offset correction error occurs, calculate a change value of a speed of the motor, and a controller configured to extract a resolver offset change value by using a resolve offset change value table for the change value of the speed of the motor.

The apparatus may further include a storage configured to store the resolver offset change value table according to the change of the speed of the motor in advance.

The resolver offset correction error determining unit may determine the offset error after determining a coupling state of the engine and the motor and if it is determined that the engine and the motor is coupled to each other.

The resolver offset correction error determining unit may determine that the resolver offset correction error exists when the engine clutch is released and the motor torque command is 0.

The control unit may calculate a final resolver offset correction value by adding the resolver offset change value to a preset existing resolver offset correction value.

The control unit may extract the resolver offset changing value when the change value of the speed of the motor is 0 or more.

The control unit may maintain the existing resolver offset correction value when the change value of the speed of the motor is less than 0 or the resolver offset correction error determining unit determines that there is no resolver offset correction error.

The motor speed change value calculating unit may calculate the change value of the speed of the motor speed by using a torque of the motor, a frictional coefficient, a speed of the motor, and a rod torque.

In accordance with an aspect of the present disclosure, there is provided a system for correcting an offset of a resolver, the system including a resolver offset correcting apparatus configured to determine whether a resolver offset correction error occurs, by determining whether an engine clutch is released and a torque command of a motor, to if it is determined that the resolver offset correction error occurs, extract a resolver offset change value by using a change value of a speed of the motor, and to correct the offset of the resolver by using the extracted resolver offset change value, a coordinate converting unit configured to convert a voltage command of the motor to a 3-phase voltage by using the resolve offset change value, a PWM signal generating unit configured to generate a PWM signal by using the 3-phase voltage, and a PWM inverter configured to control driving of the motor by switching the motor by using the PWM signal.

The resolver offset correcting apparatus may include a resolver offset correcting error determining unit configured to determine whether a resolver offset correction error exists, by determining whether an engine clutch is released and a torque command of a motor, a motor speed change value calculating unit configured to, if it is determined that the resolver offset correction error occurs, calculate a change value of a speed of the motor, a controller configured to extract a resolver offset change value by using a resolver offset change value table for the change of the speed of the motor, and a storage configured to store the resolver offset change value table according to the change of the speed of the motor in advance.

The control unit may calculate a final resolver offset correction value by adding the resolver offset change value to a preset existing resolver offset correction value.

The control unit may extract the resolver offset changing value when the change value of the speed of the motor is 0 or more.

The control unit may maintain the existing resolver offset correction value when the change value of the speed of the motor is less than 0 or the resolver offset correction error determining unit determines that there is no resolver offset correction error.

The coordinate converting unit may output the 3-phase voltage by using the final resolver offset correction value.

The system may further include a current command generating unit configured to receive a torque command and an inverse magnetic flux to calculate d-axis and q-axis current commands of the motor, and a current controller configured to output the voltage command by using the current command.

In accordance with an aspect of the present disclosure, there is provided a method for correcting an offset of a resolver, the method including determining whether a resolver offset correction error exists, by determining whether an engine clutch is released and a torque command of a motor, if it is determined that the resolver offset correction error occurs, calculating a change value of a speed of the motor, and extracting a resolver offset change value by using a resolve offset change value table for the change of the speed of the motor.

The determining of whether the resolver offset correction error occurs may include determining that the resolver offset correction error exists when the engine clutch is released and the motor torque command is 0.

The method may further include calculating a final resolver offset correction value by adding the resolver offset change value to a preset existing resolver offset correction value.

The method may further include correcting the resolver correction error by using the final resolver offset correction value.

The method may further include maintaining the existing resolver offset correction value when the change value of the speed of the motor is less than 0 or a resolver offset correction error determining unit determines that there is no resolver offset correction error.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
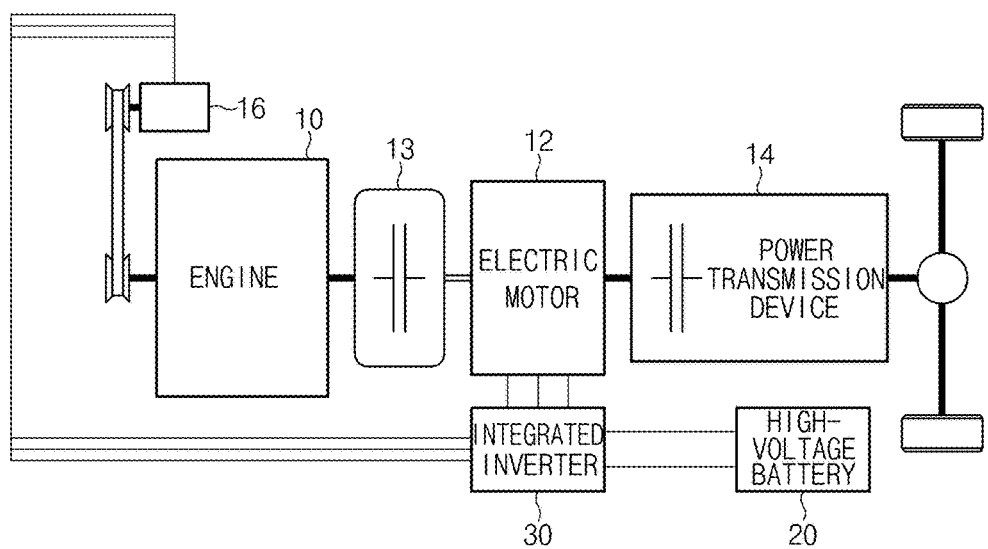
FIG. 1 is a schematic diagram of an environment-friendly vehicle, to which a method for preventing divergence of a speed of a motor is applied, according to an embodiment of the present disclosure.

Hereinafter, embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, tams, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific tams, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

The present disclosure may prevent divergence of a speed of a motor by calculating a resolver offset change value according to a change of a speed of a motor by using a resolver offset change value mapping table according to the change of the speed of the motor and additionally correcting the resolver offset by using the resolver offset change value in order to detect an offset still generated by noise even after correction of a resolver offset, thereby preventing damage of the motor.

Hereinafter, embodiments of the present disclosure will be described in detail with reference to FIGS. 1 to 14.

An aspect of the invention provides a method for correcting a resolver-offset error for a wheel-driving motor in a hybrid vehicle.

In a hybrid vehicle, a resolver 50 connected to a wheel-driving motor 12 senses a rotational position of the motor (angle of rotor). At least one controller 160 of the hybrid vehicle controls operation of the motor using the sensed rotational position. In controlling the motor (while the vehicle is driving using D gear), the controller 160 uses a predetermined correction value θ to compensate offset of the solver 50.

Figure 8A:
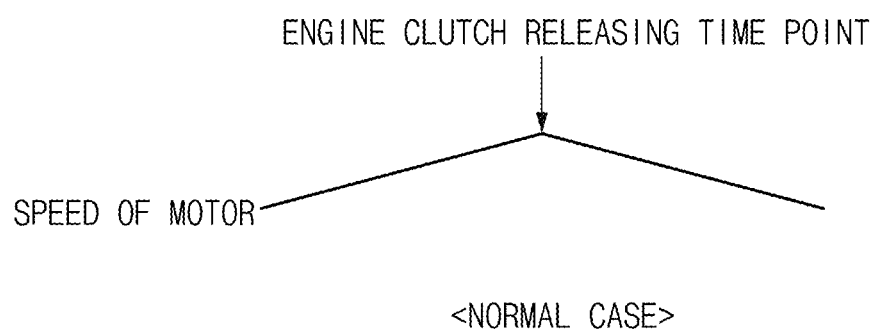
FIG. 8A is a graph depicting a relationship between a speed and a torque of a normal motor at a time point at which an engine clutch is released according to an embodiment of the present disclosure.
Figure 8B:
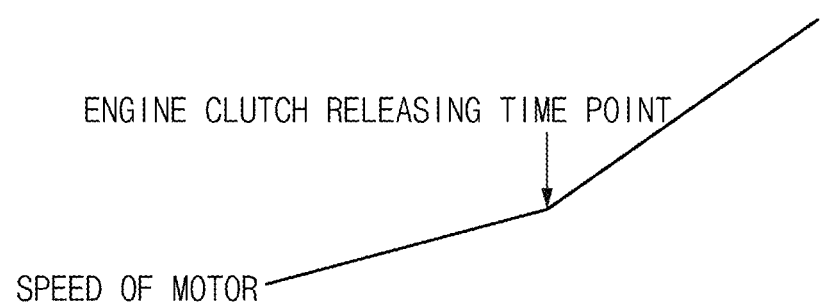
FIG. 8B is a graph depicting a relationship between a speed and a torque of a normal motor when an offset of a resolver is distorted in a (−) direction at a time point at which an engine clutch is released according to an embodiment of the present disclosure.

Subsequently, when an engine clutch release occurs for a braking operation or for a gear shift (D to N), the controller determines whether the current correction value θ is proper to compensate current offset of the resolver 50. In embodiments, the controller determines that current correction value θ is improper when an abnormal motor speed change (divergence is shown in FIGS. 8A and 8B) follows the engine clutch release.

Subsequently, when it is determined that the current correction value θ is improper, the controller 160 determines a new correction value (θ new) using a predetermined table. In embodiments, following the engine clutch release, the controller computes a rate of motor speed change (when there is no driver's input, no control command for the more to generate torque), and use the computed rate to determine the new correction value using the predetermined table.

Figure 2:
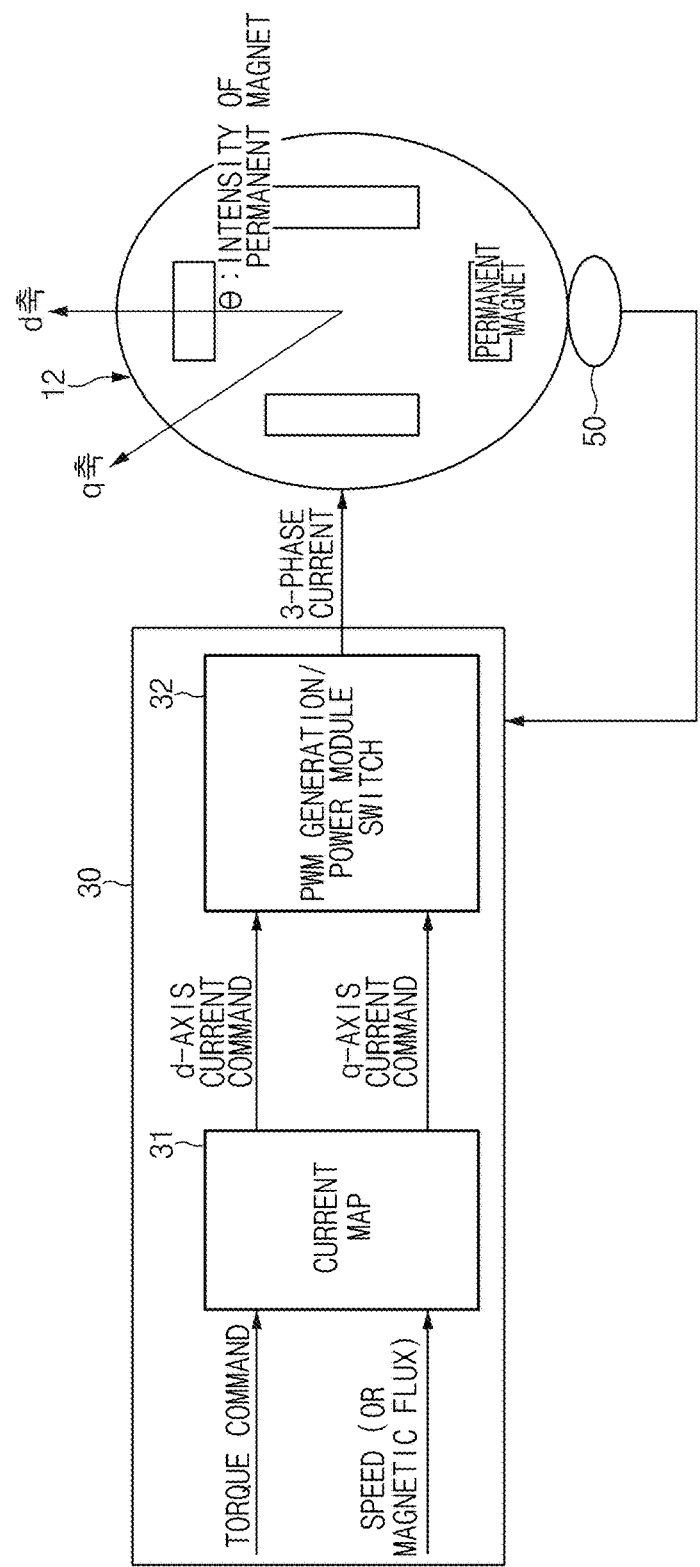
FIG. 2 is a diagram illustrating connection of an inverter and a motor, to which a method for preventing divergence of a speed of a motor is applied, according to an embodiment of the present disclosure.

FIG. 1 is a schematic diagram of an environment-friendly vehicle, to which a method for preventing divergence of a speed of a motor is applied, according to an embodiment of the present disclosure. FIG. 2 is a diagram illustrating connection of an inverter and a motor, to which a method for preventing divergence of a speed of a motor is applied, according to an embodiment of the present disclosure.

As illustrated in FIG. 1, a vehicle includes an engine 10 and a motor 12 arranged in series, a clutch 13 arranged between the engine 10 and the motor 12 a transmission 14 configured to gear-shift the power of the motor or the motor and the engine with driving wheels, a hybrid starter generator 16 that is a kind of a motor connected to a crank pulley of the engine to transmit a power and configured to start the engine and charge the battery, an inverter 30 for controlling the motor and controlling the power generation, and a high-voltage battery 20 connected to an inverter to be charged or discharged such that electric power is provided to the motor 12.

The electric motor 12 is an interior permanent magnet (IPM) type motor and has a structure in which a magnet is buried in the interior of a rotor. The IPM type motor easily prevent spattering of a permanent magnet during high-speed rotation thereof and may allow high torque and high efficiency by using a magnetic torque and a reluctance torque together.

As illustrated in FIG. 2, the inverter 30 includes a current map 31 configured to command d-axis and q-axis currents according to a torque command and a speed (or magnetic flux) command, and a power switching module 32 configured to apply a 3-phase current to the motor by using PWM control according to the current command of the current map, and a resolver 50 that is a kind of a rotational angle detecting sensor configured to detect an absolute location of a rotor and transmit a detection signal to the inverter 30 is mounted in the motor 12.

The resolver 50 is mounted in the motor to be used to predict a location, a speed, and an angle of the central axis of the rotor, and includes a reference coil and an output coil.

The reference coil of the resolver 50 applies an excitation input signal, and the speed and the location of the rotor is estimated by the controller of the inverter by using an output voltage signal output from the output coil.

Because a location offset between the rotor and the resolver of the motor may be generated due to various reasons such as an assembly tolerance between the motor and the resolver and an inaccuracy of the location of the coil in the interior of the resolver and it is impossible to reflect the accurate location of the rotor during control of the motor unless the output signal of the resolver has to be corrected by the offset, it is necessary to correct the offset of the resolver. Accordingly, because the offset of the resolver may be corrected by using an existing resolver offset correction value set during mass-production of the resolver but an error may continuously exist due to noise or the like even after the correction of the offset of the resolver, the resolver offset correction error is detected after the correction of the offset of the resolver and the resolver offset correction value is corrected in the present disclosure.

Figure 3:
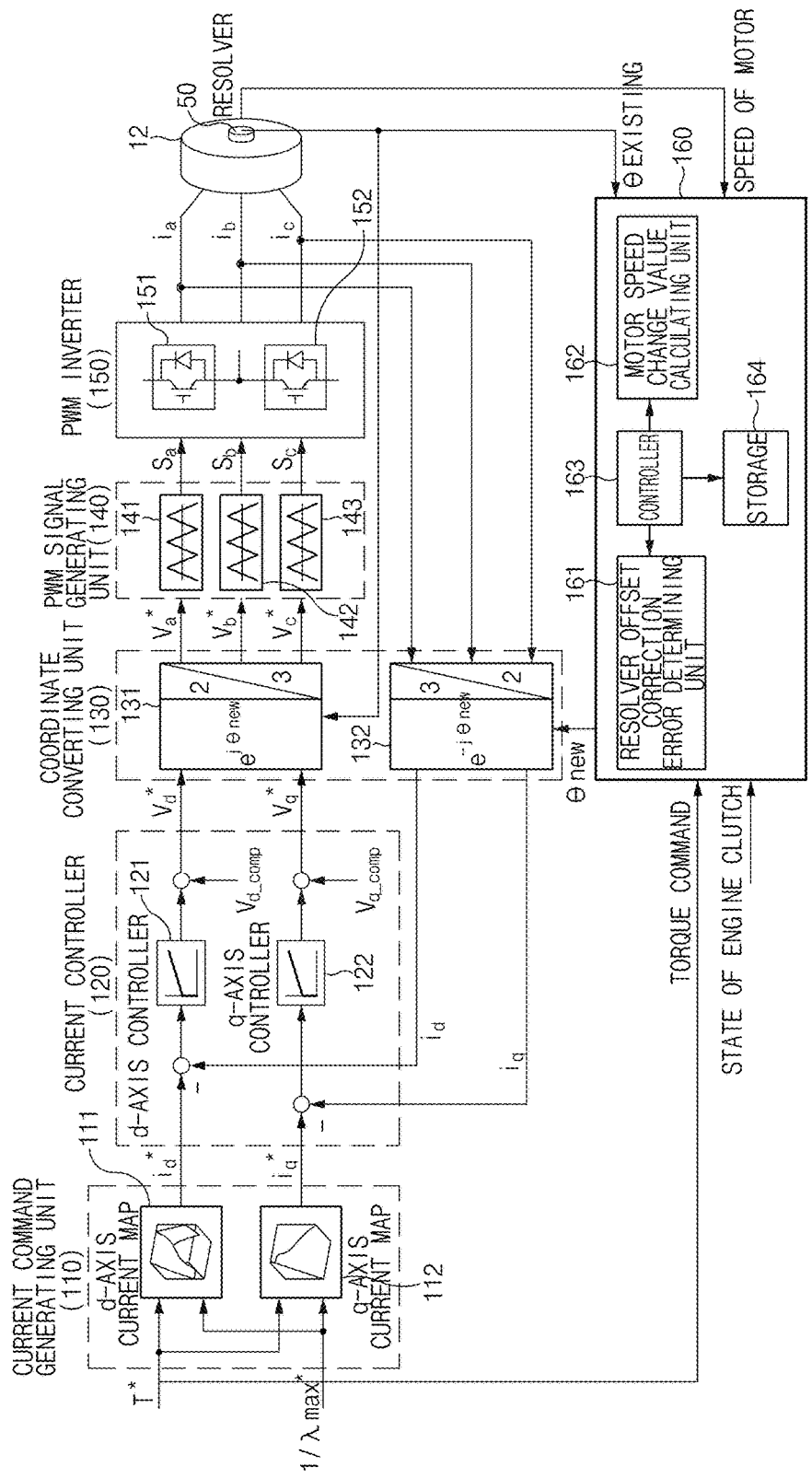
FIG. 3 is a diagram of a system for correcting an offset of a resolver according to an embodiment of the present disclosure.

FIG. 3 is a diagram of a resolver offset correcting system according to an embodiment of the present disclosure, and referring to FIG. 3, the resolver offset correcting system according to an embodiment of the present disclosure includes a current command generating unit 110, a current controller 120, a coordinate converting unit 130, a PWM signal generating unit 140, a PWM inverter 150, and a resolver offset correcting apparatus 160.

The current command generating unit 110 receives a torque command (T*) and an inverse magnetic flux (1/λmax), and generates a d/q-axis current command of the motor. To achieve this, the current command generating unit 110 includes a d-axis current map 111 and a q-axis current map 112. Then, the torque command (T*) is determined according to a degree by which an accelerator of the vehicle is trodden, and the inverse magnetic flux (1/λmax) is determined by a relationship between the speed of the motor and the voltage of the battery and is proportional to the speed and inversely proportional to the voltage of the battery. The d-axis current map 111 outputs a d-axis current command id* by using the torque command (T*), and the q-axis current map 112 receives an inverse magnetic flux (1/λmax) and outputs a q-axis current command iq*.

The current controller 120 includes a proportional integration controller (PI controller), and a current command input from the current command generating unit 110 is compared with the sensed current values id and iq and the difference value is applied to the d-axis controller 121 and the q-axis controller 122 that are PI controllers. Accordingly, the d-axis controller 121 outputs a voltage command vd* and the q-axis controller 122 outputs a voltage command vq*.

The coordinate converting unit 130 performs coordinate conversion of the voltage commands vd* and vq* by using the angle value of the motor received from the resolver 50 of the motor to convert the voltage commands to 3-phase voltages Va, Vb, and Vc.

The PWM signal generating unit 140 passes the 3-phase voltages Va, Vb, and Vc received from the coordinate converting unit 130 through the PWM controller 141, 142, and 143 and outputs the PWM signals Sa, Sb, and Sc that are suitable for the size of the 3-phase voltages.

The PWM inverter 150 outputs the PWM signals Sa, Sb, and SC to the motor 12 as 3-phase currents ia, ib, and ic.

That is, the PWM inverter 150 switches the electrical switches 151 and 152 according to the duty cycle of the PWM, and a voltage is applied to the motor 12 through the switching operation and if the motor is driven, a motor current is generated and thus a torque of the motor is generated. Then, the 3-phase currents ia, ib, and ic are input to the coordinate converting unit 130, and the coordinate converting unit 130 outputs d/q-axis currents id and iq by using the 3-phase currents ia, ib, and ic.

The resolver offset correcting apparatus 160 determines whether a resolver offset correction error occurs by determining whether an engine clutch is released and a motor torque command, extracts a resolver offset change value by using a change value of a speed of a motor when there occurs a resolver offset correction error, and corrects the offset of the resolver by using the extracted resolver offset change value.

To achieve this, the resolver offset correcting apparatus 160 includes a resolver offset correction error determining unit 161, a motor speed change value calculating unit 162, a controller 163, and a storage 164.

The resolver offset correction error determining unit 161 determines whether a resolver offset correction error occurs by determining whether the engine clutch is released and the motor torque command. The resolver offset correction error determining unit 161 may determine an offset error when the engine and the motor are coupled to each other by determining a coupling state of the engine and the motor. Further, the resolver offset correction error determining unit 161 may determine that a resolver offset correction error exists when the engine clutch is released and the motor torque command is 0.

The motor speed change value calculating unit 162 calculates a change value of a speed of a motor if it is determined that a resolver offset correction error occurs. The motor speed change value calculating unit 162 may calculate a change value of a speed of a motor by using a torque of a motor, a frictional coefficient, a speed of the motor, and a rod torque.

The controller 163 extracts a resolver offset change value (θ add) by using a resolver offset change value table for the change of the speed of the motor. The controller 163 calculates a final resolver offset correction value (θ new) by adding a resolver offset change value (θ add) to a preset existing resolver offset correction value (θ) during mass-production of the resolver. The control unit 163 extracts the resolver offset change value when the change value of the speed of the motor is 0 or more. The controller 163 may maintain the existing resolver offset correction value when the change value of the speed of the motor is less than 0 or the resolver offset correction error determining unit determines that there is not resolver offset correction error.

The storage 164 stores a resolver offset change value table according to the change of the speed of the motor in advance. Then, the resolver offset change value table according to the change of the speed of the motor may be generated and stored through experimental values and actually measured values in advance, and will be described in more detail with reference to FIG. 12 and Table 4 below.

In this way, the resolver offset correcting apparatus according to embodiments of the present disclosure may prevent abnormal divergence of the motor by determining a resolver offset correction error and by extracting a resolver offset change value according to the change of the speed of the motor and correcting a correction value for correcting the offset of the resolver when there is a resolver offset correction error, thereby preventing damage of the motor.

Figure 4:
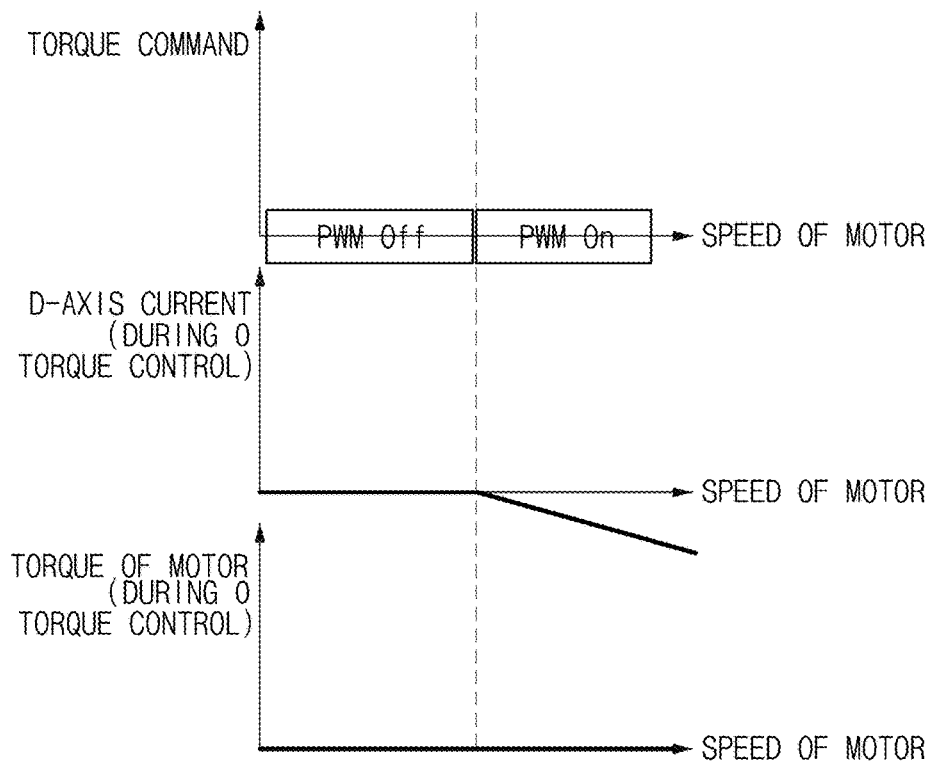
FIG. 4 is a graph depicting a torque and a d axis current during control of an IPM motor according to an embodiment of the present disclosure.

FIG. 4 is a graph depicting a torque and a d axis current during control of an IPM motor according to an embodiment of the present disclosure. Referring to FIG. 4, output of a PWM signal is stopped to reduce loss of the PWM as there is not current command when the IPM motor is operated at a low speed and the PWM signal is output when the IPM motor is operated at a middle/high speed (not less than a specific speed) during control of the torque of the IPM motor to 0.

In the case of the middle/high speed, if the torque of the IPM motor is controlled to 0, a voltage use area by a counter electromotive force of a magnet of the motor is reduced so that the torque of the motor is controlled to 0 by applying the d-axis current in the (−) direction. Then, if the d-axis current is applied, the PWM signal has to be output. However, even though the d-axis current is applied, the actual torque of the motor becomes 0 if the q-axis current is 0.

Figure 5:
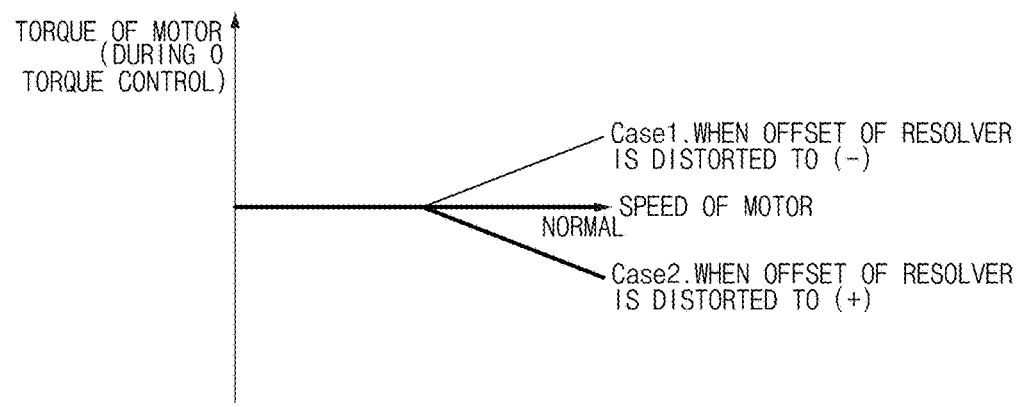
FIG. 5 is a graph depicting a torque actually measured during zero-torque control when an offset of a resolver is distorted according to an embodiment of the present disclosure.

FIG. 5 is a graph depicting a torque actually measured during zero-torque control when an offset of a resolver is distorted according to an embodiment of the present disclosure.

An error may be generated when the resolver is manufactured and mounted during mass-production of the motor, and the offset of the resolver is corrected in a manner the offset of the resolver is extracted in a software way for each vehicle and the offset of the resolver is compensated for. However, the resolver may be wrongly corrected due to noise and the like during correction of the resolver so that the offset of the resolver may still exist even though the resolver is corrected. For example, when the correction of the offset of the resolver fails, a torque error may be generated even though a torque command is 0 in a middle/high speed area.

In this way, the speed of the motor diverges due to an actual torque value existing even when the torque command is 0 as the correction of the offset of the resolver fails, and it can be seen from Table 1 and FIG. 5 that the actual torque value has a (+) value when the torque command is 0 if the offset of the resolver is distorted in the (−) direction and the actual torque value may have a (−) value when the torque command is 0 if the offset of the resolver is distorted in the (+) direction.

TABLE 1

|  | Normal | When offset of resolver is distorted to (−) | When offset of resolver is distorted to (+) |
|---|---|---|---|
| Actual torque during 0 torque control | 0 | (+) torque | (−) torque |

Figure 6A:
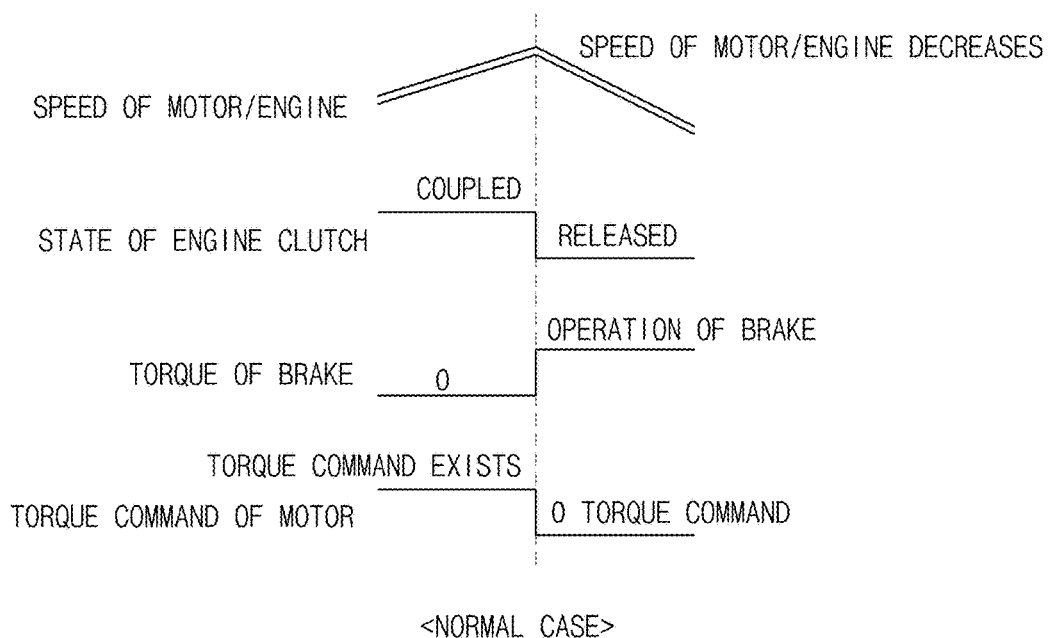
FIG. 6A is a view illustrating a case in which a motor is normally operated when a brake pedal is trodden during zero-torque control of a motor during driving of a vehicle according to an embodiment of the present disclosure.
Figure 6B:
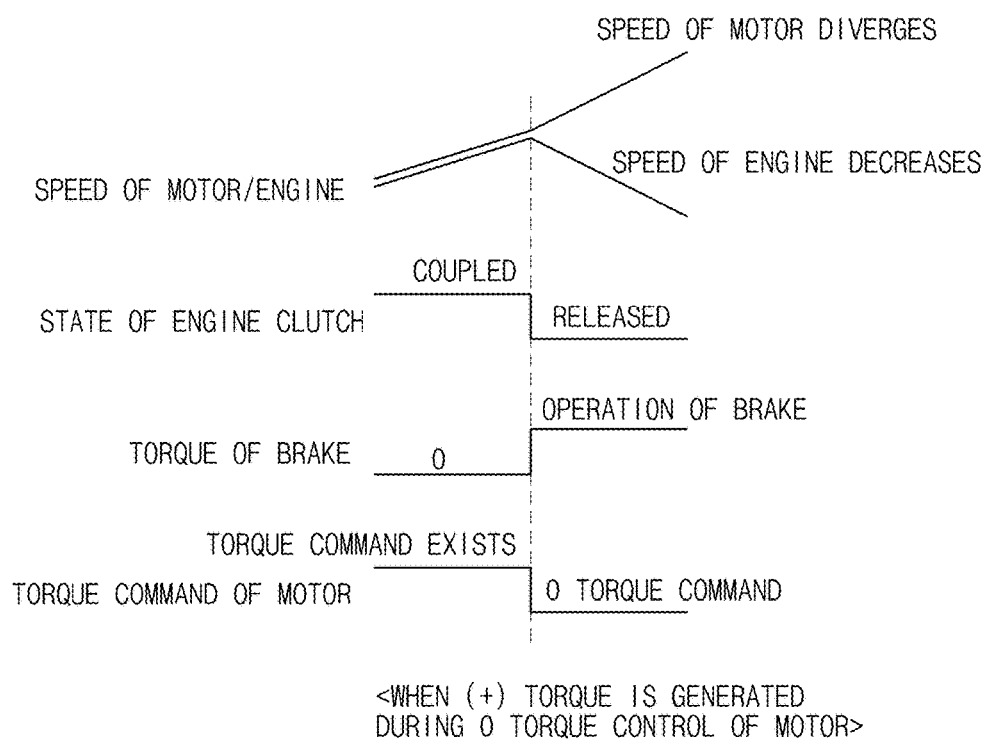
FIG. 6B is a view illustrating a case in which a speed of a motor diverges when a brake pedal is trodden during zero-torque control of a motor during driving of a vehicle according to an embodiment of the present disclosure.

FIG. 6A is a view illustrating a case in which a motor is normally operated when a brake pedal is trodden during zero-torque control of a motor during driving of a vehicle according to an embodiment of the present disclosure. FIG. 6B is a view illustrating a case in which a speed of a motor diverges when a brake pedal is trodden during zero-torque control of a motor during driving of a vehicle according to an embodiment of the present disclosure.

In the following description, it is assumed that the vehicle travels while the motor and the engine is coupled to each other, and the engine clutch is released while the brake is operated so that both the speed of the motor and the speed of the engine decrease.

Referring to FIG. 6A, it can be seen that in a normal case, the motor is brought into a non-load state because it does not have a part connected to a load as the engine clutch is released and a torque is not generated when the torque command is 0 so that the speed of the motor decreases due to a natural loss by a mechanical friction.

Referring to FIG. 6B, it can be seen that when a resolver offset correction error exists, an actual torque exists even though a torque command is 0 so that the speed of the motor increases and diverges because the motor in a non-load state oscillates the speed of the motor to a small actual torque value.

Accordingly, it is important to accurately correct the offset of the resolver that is a difference between a torque command and an actual torque value.

Figure 7A:
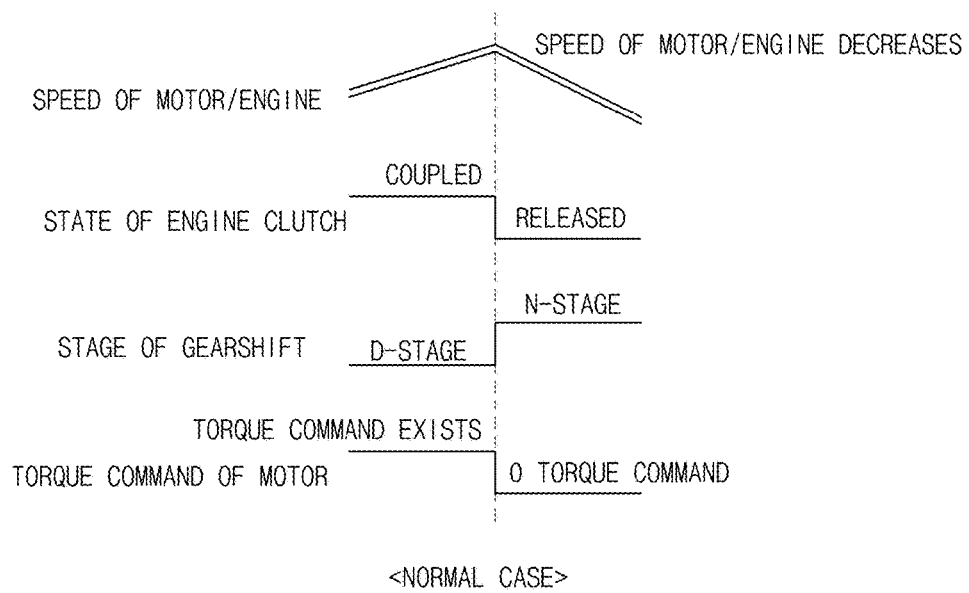
FIG. 7A is a view illustrating a case in which a motor is normally operated when a gear is shifted from a D-stage to an N-stage during zero-torque control of a motor during driving of a vehicle according to an embodiment of the present disclosure.
Figure 7B:
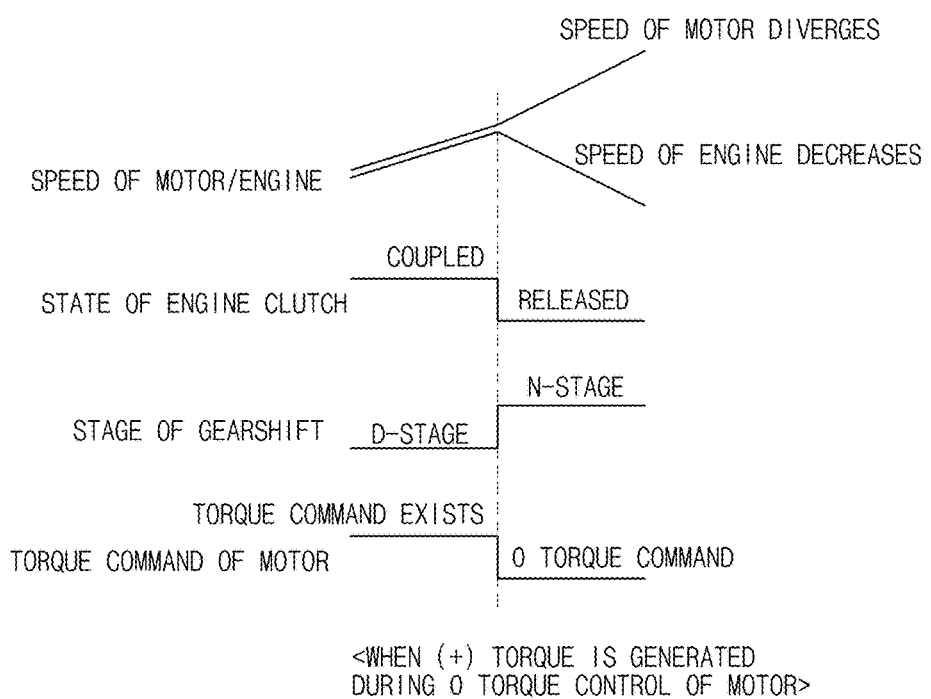
FIG. 7B is a view illustrating a case in which a speed of a motor diverges when a gear is shifted from a D-stage to an N-stage during zero-torque control of a motor during driving of a vehicle according to an embodiment of the present disclosure.

FIG. 7A is a view illustrating a case in which a motor is normally operated when a gear is shifted from a D-stage to an N-stage during zero-torque control of a motor during driving of a vehicle according to an embodiment of the present disclosure. FIG. 7B is a view illustrating a case in which a speed of a motor diverges when a gear is shifted from a D-stage to an N-stage during zero-torque control of a motor during driving of a vehicle according to an embodiment of the present disclosure.

In the following description, it is assumed that the vehicle travels while the motor and the engine is coupled to each other, and the engine clutch is released if the transmission gear is shifted from the D-stage to the N-stage so that both the speed of the motor and the speed of the engine decrease.

Referring to FIG. 7A, it can be seen that in a normal case, the motor is brought into a non-load state because it does not have a part connected to a load as the engine clutch is released and a torque is not generated when the torque command is 0 so that the speed of the motor decreases due to a natural loss by a mechanical friction.

Referring to FIG. 7B, it can be seen that when an offset of the resolver exists, an actual torque exists even though a torque command is 0 so that the speed of the motor increases and diverges because the motor in a non-load state oscillates the speed of the motor to a small actual torque value.

Figure 8C:
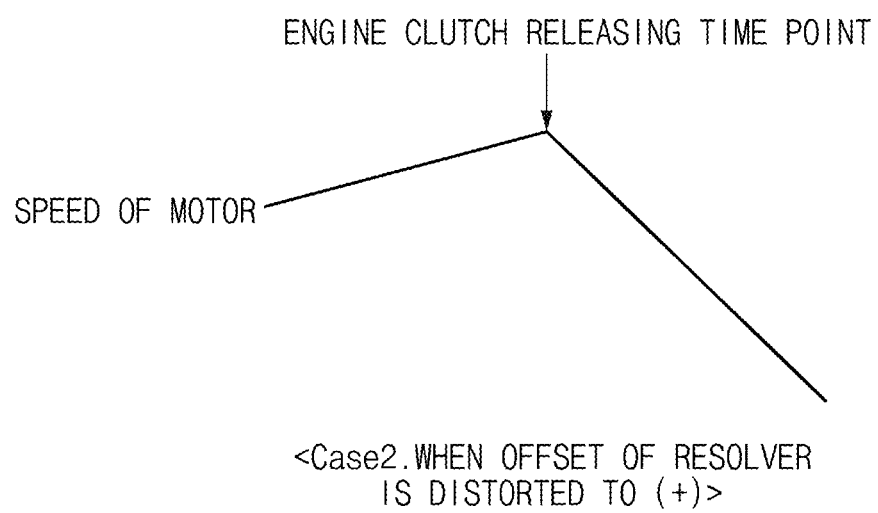
FIG. 8C is a graph depicting a relationship between a speed and a torque of a normal motor when an offset of a resolver is distorted in a (+) direction at a time point at which an engine clutch is released according to an embodiment of the present disclosure.

FIG. 8A is a graph depicting a relationship between a speed and a torque of a normal motor at a time point at which an engine clutch is released according to an embodiment of the present disclosure. FIG. 8B is a graph depicting a relationship between a speed and a torque of a normal motor when an offset of a resolver is distorted in a (−) direction at a time point at which an engine clutch is released according to an embodiment of the present disclosure. FIG. 8C is a graph depicting a relationship between a speed and a torque of a normal motor when an offset of a resolver is distorted in a (+) direction at a time point at which an engine clutch is released according to an embodiment of the present disclosure.

FIGS. 8A to 8C illustrate a change of a speed of the motor by an offset of the resolver when a torque command is 0 in the case in which the engine clutch is released and the motor is operated in a non-load state.

An equation for calculating a torque T of the motor is as in Equation 1.

$$T = J*dw/dt + B*w + TL \qquad \text{[Equation 1]}$$

J is an inertia of the motor, dw/dt is a change degree of the speed of the motor, B is a frictional coefficient, w is a speed of the motor, TL is a rod torque, and T is a torque of the motor.

Then, when TL is 0, Equation 1 may be deployed as in Equation 2.

$$dw/dt = (T - B*w)/J \qquad \text{[Equation 2]}$$

TABLE 2

|  | Normal | When offset of resolver is distorted to (−) | When offset of resolver is distorted to (+) |
|---|---|---|---|
| T (during 0 torque control, actual torque) | 0 | (+) torque | (−) torque |
| dw/dt (change of speed) | −B * w/J | (T − B * w)/J | (T − B * w)/J |
| When T is larger than B * w, dw/dt | (−) value −> speed of motor decreases | (+) value −> speed of motor diverges | (−) value −> speed of motor decreases |

Referring to Table 2 and FIG. 8A, it can be seen that in a normal case, the torque of the motor is 0 and the speed of the motor by friction B decreases when the engine clutch is released.

Referring to Table 2 and FIG. 8B, it can be seen that the speed of the motor increases and diverges when the offset of the resolver is distorted in the (−) direction.

Referring to Table 2 and FIG. 8C, it can be seen that the speed of the motor decreases and diverges when the offset of the resolver is distorted in the (+) direction.

Table 3 represents a change of the torque and the speed by a difference of the offsets of the resolver.

TABLE 3

|  | Normal | When offset of resolver is distorted by θrr |
|---|---|---|
| d/q-axis current | $\begin{bmatrix} id \\ iq \end{bmatrix}$ | $\begin{bmatrix} id\_err \\ iq\_err \end{bmatrix} = \begin{bmatrix} \cos\theta err & \sin\theta err \\ -\sin\theta err & \cos\theta err \end{bmatrix} \begin{bmatrix} id \\ iq \end{bmatrix}$ |
| d/q-axis current during 0 torque control (middle speed area) | id = α<br>iq = 0<br>T = 0 | $id_{err}$ = α_err<br>$iq_{err}$ = β_err ≠ 0<br>$T_{err}$ = γ_err ≠ 0 |
| Is [=sqrt (id^2+iq^2)] | Is=sqrt(id^2+iq^2) | Is_err=sqrt (id_err^2+iq_err^2) =sqrt [id^2* (cos^2θerr+sin^2θerr) +iq^2* (sin^2θerr+cos^2θerr)] =sqrt (id^2+iq^2) |
| Torque | T=(3/2) * (P/2) * (λ d*iq- λ q*id) =0 | T_err= (3/2)*(P/2)*( λ d_err*iq_err- λ q_err*id_ee) =γ+err≠0 |

Referring to Table 3, when the offset of the resolver is distorted, the magnitude Is of the current is the same as the magnitude of the existing current but id/iq is changed and a torque is generated.

Then, in Table 3, id and iq are a d-axis current and a q-axis current in a normal case, and id_err/iq_err is a d/q-axis current when the offset of the resolver is distorted. T is a torque in a normal case and T_err is a torque when the offset of the resolver is distorted. λd/λ is a d/q-axis flux in a normal case and λd_err/λq err is a d/q-axis flux of the motor when the offset of the resolver is distorted. P is the number of poles of the motor.

Figure 9:
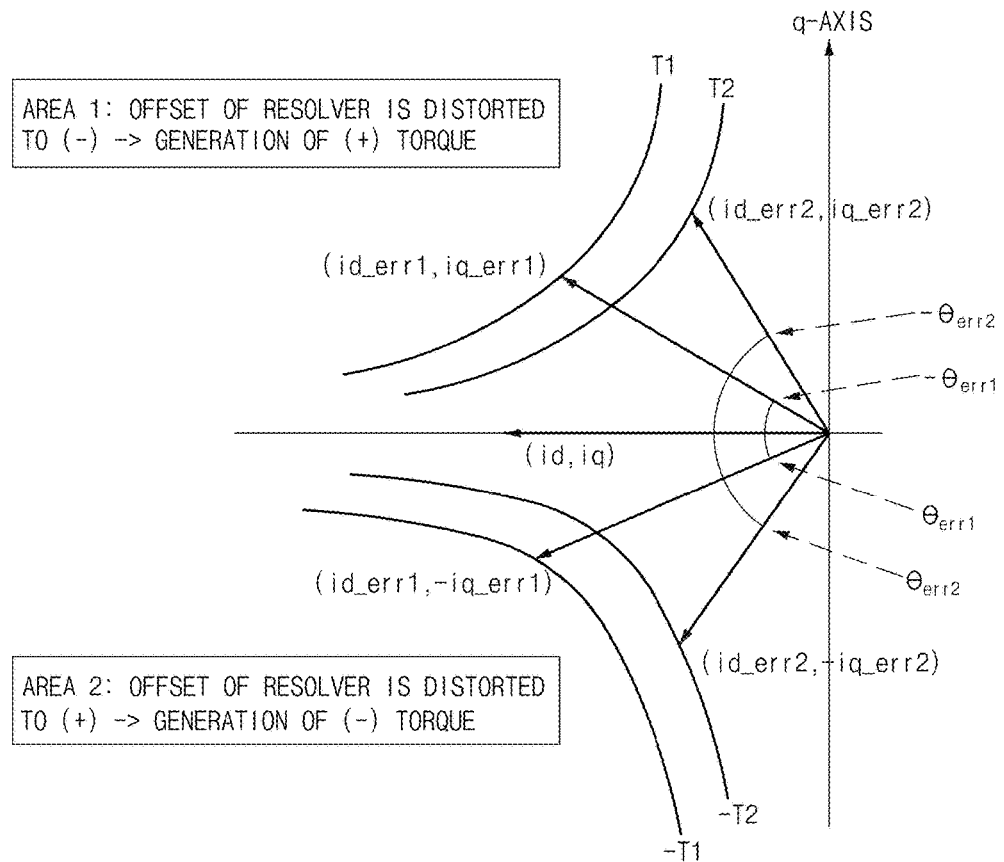
FIG. 9 is a view illustrating changes of a current operation point and a torque due to a difference between offsets of a resolver according to an embodiment of the present disclosure.

FIG. 9 is a view illustrating changes of a current operation point and a torque due to a difference between offsets of a resolver according to an embodiment of the present disclosure.

Referring to FIG. 9, when the offset of the resolver is normal, an operation point of current becomes (id, iq) and the torque becomes 0. When the offset of the resolver is distorted in the direction of area 1 (the (−) direction, a direction in which a (+) torque is generated), the distorted angle becomes −θerr1, the operation point of current becomes [id_err1, iq_err1], and the torque becomes T1. Then, the torque T1 has a value that is larger than the torque T2. Further, when the clutch is released due to the torque in the (+) direction, the speed of the motor diverges.

When the offset of the resolver is distorted in the direction of area 2 (the (+) direction, a direction in which a (−) torque is generated), the distorted angle becomes −θerr1, the operation point of current becomes [id_err1, −iq_err1], and the torque becomes −T1. The absolute value of T2 is smaller than the absolute value of T1. Further, when the clutch is released due to the torque in the (−) direction, the speed of the motor decreases.

Figure 10:
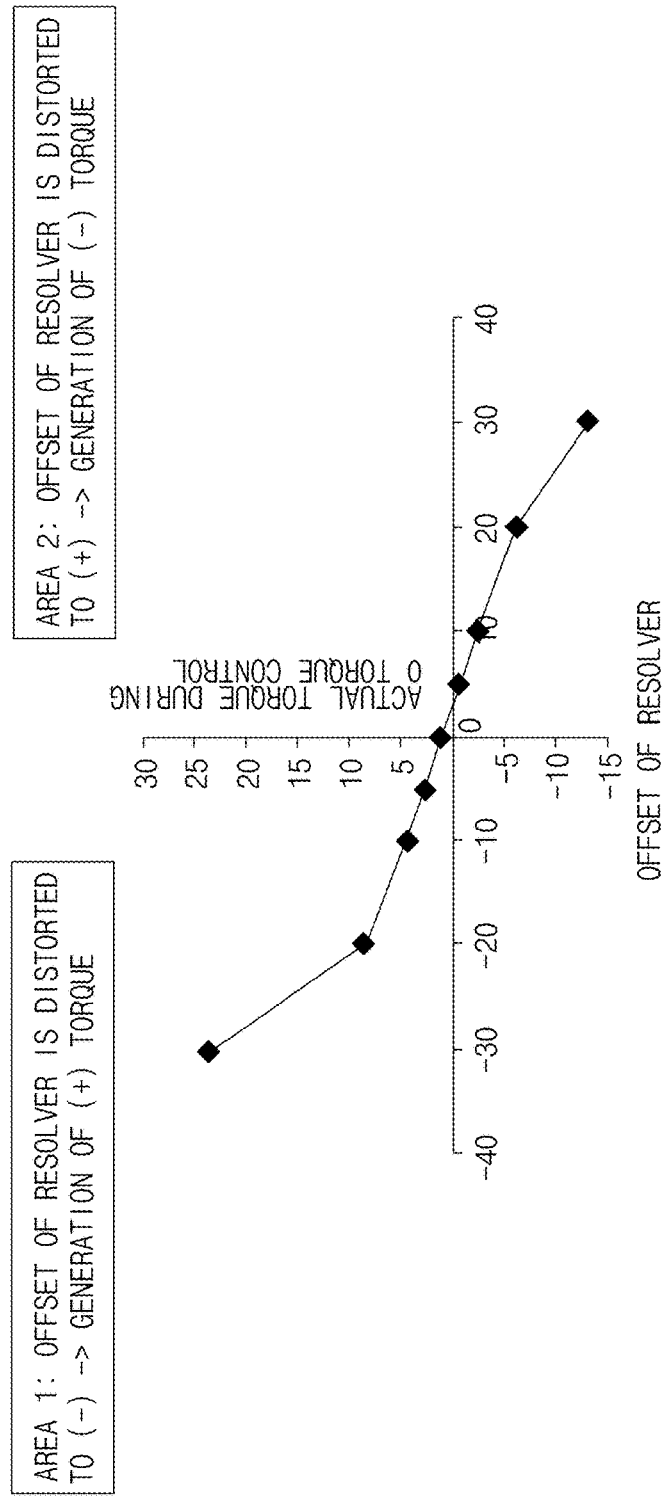
FIG. 10 is a graph depicting a change of an actual torque during zero-torque control depending on a change of an offset of a resolver, according to an embodiment of the present disclosure.

FIG. 10 is a graph depicting a change of an actual torque during zero-torque control depending on a change of an offset of a resolver, according to an embodiment of the present disclosure.

Referring to FIG. 10, if the offset of the resolver is distorted when the torque command is 0 in a middle/high speed area, the operation point of current is changed from the operation point (id, iq) to the distorted operation point (id_err, iq_err) and the torque T1 is generated. FIG. 10 illustrates an actual torque value when a torque command is 0 in the case in which an offset of the resolver of the actual motor exists.

Figure 11A:
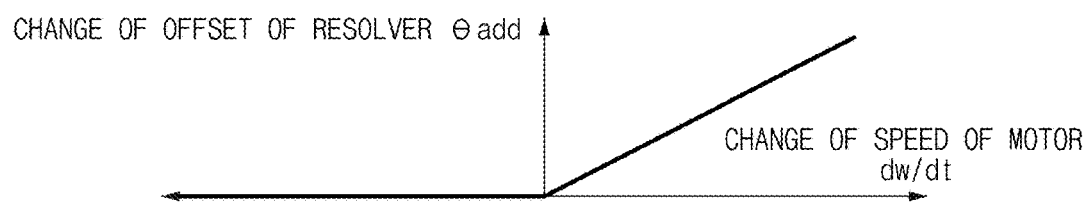
FIG. 11A is a graph depicting a resolver offset change value according to a change of a speed of a motor according to an embodiment of the present disclosure.

FIG. 11A is a graph depicting a resolver offset change value according to a change of a speed of a motor according to an embodiment of the present disclosure. Referring to FIG. 11A and Table 4, the actual torque becomes 0 when the offset of the resolver is not changed. Next, the torque is measured after the resolver is distorted by a degree of γ1, a value of β1 is obtained, and a change value (dw/dt) of the speed of the motor is calculated by applying the value of β1 to Equation 2. The change value of the speed of the motor may be calculated by performing the same procedure for γ2 and γ3.

Accordingly, the table for the change value of the offset of the resolver according to the change of the speed of the motor is as Table 4.

TABLE 4

| Item | Change of speed of motor (dw/dt) | Actual torque during 0 torque control | Resolver offset change θ |
|---|---|---|---|
| Normal | (−) −> speed of motor decreases | 0 | 0 |
| Motor speed change 1 | α1 | β1 | γ1 |
| Motor speed change 2 | α2 | β2 | γ2 |
| Motor speed change 3 | α3 | β3 | γ3 |

Figure 11B:
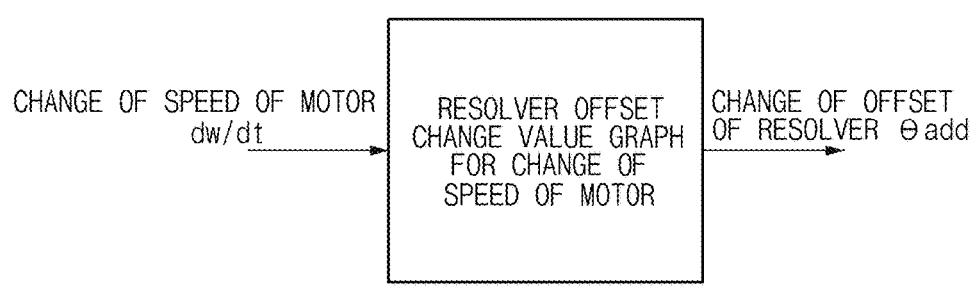
FIG. 11B is a view illustrating a configuration of calculating a resolver offset change value according to a change of a speed of a motor according to an embodiment of the present disclosure.

FIG. 11B is a view illustrating a configuration of calculating a resolver offset change value according to a change of a speed of a motor according to an embodiment of the present disclosure. FIG. 11B illustrates that a change value of an offset of a resolver may be calculated by applying the change value of the speed of the motor to the resolver offset change value graph for the change of the speed of the motor.

Figure 12:
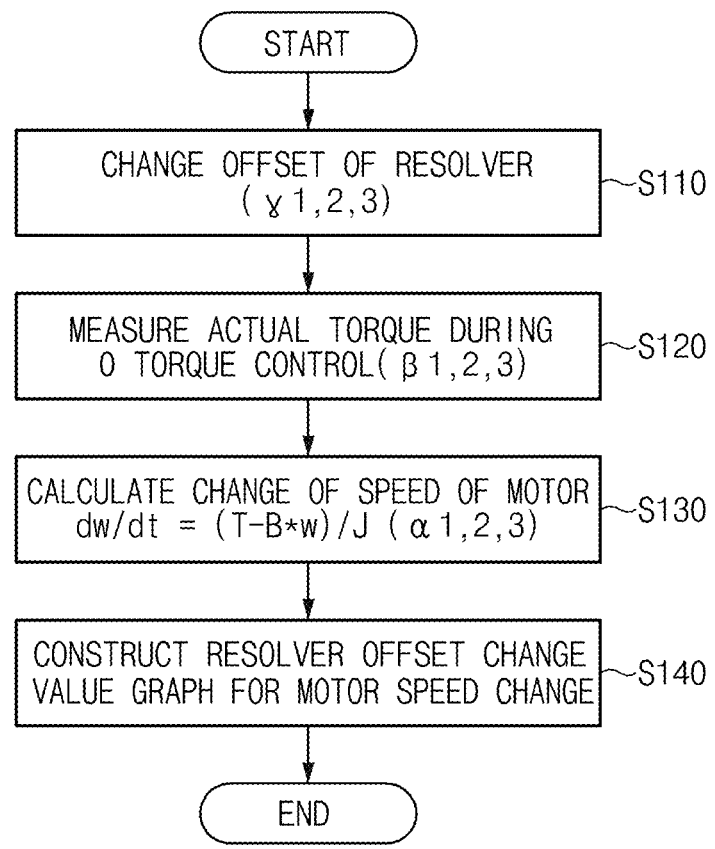
FIG. 12 is a flowchart depicting a method for constituting a graph of a resolver offset change value according to a change of a speed of a motor according to an embodiment of the present disclosure.

Hereinafter, a method for constituting a graph of a resolver offset change value according to a change of a speed of a motor according to an embodiment of the present disclosure will be described in detail with reference to FIG. 12. FIG. 12 is a flowchart depicting a method for constituting a graph of a resolver offset change value according to a change of a speed of a motor according to an embodiment of the present disclosure.

First, the resolver offset correcting apparatus 160 according to an embodiment of the present disclosure sets resolver offset change values γ1, γ2, and γ3 (S110), and measures an actual torque during a 0 torque control, of which a torque command is 0 (S120).

Thereafter, the resolver offset correcting apparatus 160 calculates a change value (dw/dt) of the speed of the motor by using Equations 1 and 2 (S130), and constructs a resolver offset change value table by mapping a resolver offset change value according to a change value of a speed of the motor and an actual torque when the torque command is 0 (S140).

Figure 13:
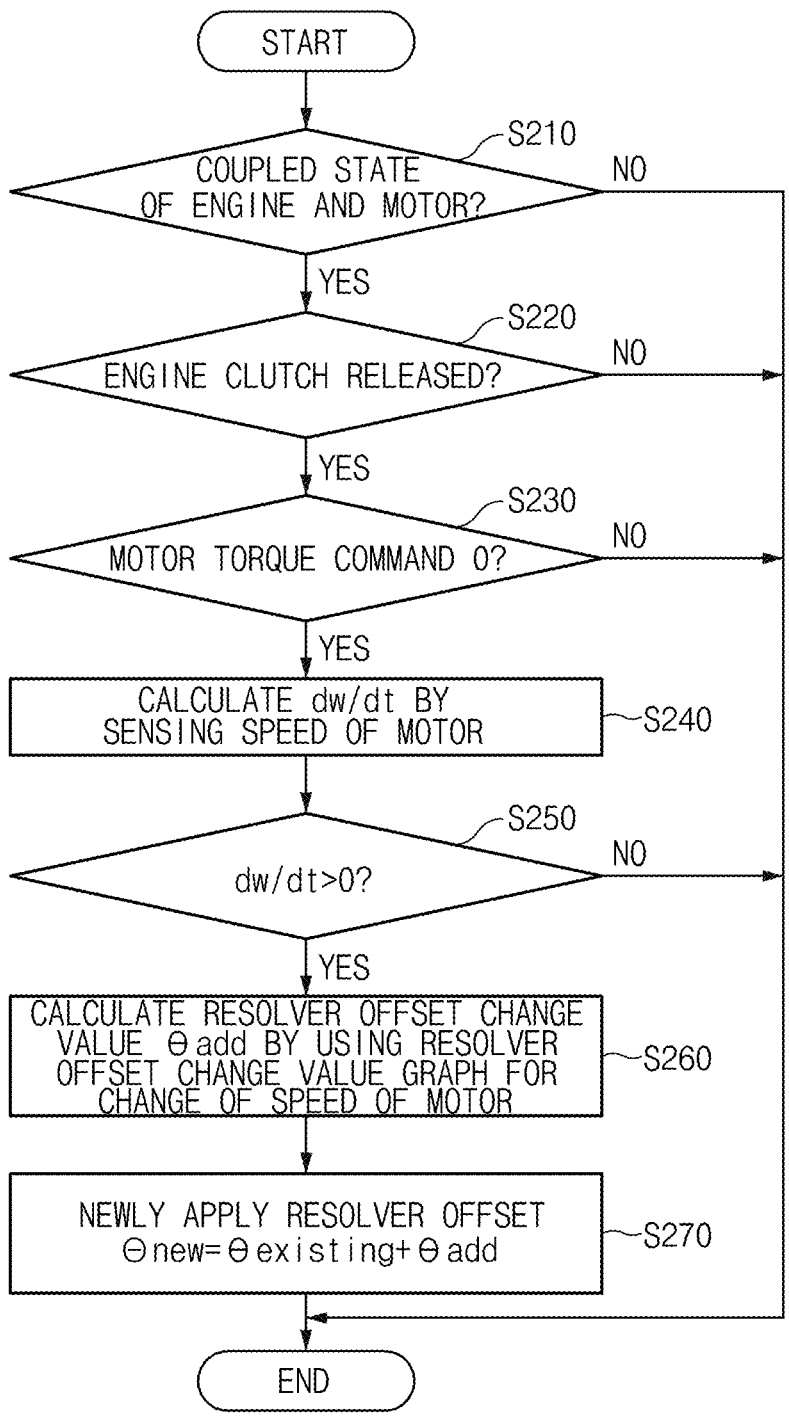
FIG. 13 is a flowchart illustrating a method for preventing divergence of a speed of a motor according to an embodiment of the present disclosure.

Hereinafter, the method for preventing divergence of the speed of the motor according to an embodiment of the present disclosure will be described in detail with reference to FIG. 13. FIG. 13 is a flowchart illustrating a method for preventing divergence of a speed of a motor according to an embodiment of the present disclosure.

The resolver offset correcting apparatus 160 determines whether the engine and the motor are coupled to each other (S210). An environment-friendly vehicle travels in a mode in which both an electric motor and an engine are used, in a mode in which only an electric motor is used, and in a mode in which only an engine is used, and because an offset of the resolver is corrected to prevent the speed of the motor from instantaneously diverging while the engine clutch is released according to embodiments of the present disclosure, it is determined first whether the engine clutch is operated and the engine and the motor are coupled to each other.

Thereafter, the resolver offset correcting apparatus 160 determines whether the engine clutch which is coupled is released (S220). This is a process for recognizing this time point because the speed of the motor diverges at a time point at which the engine clutch is released.

Subsequently, the resolver offset correcting apparatus 160 determines whether the torque command of the motor is 0 in a state in which the engine clutch is released (S230). When the accelerator pedal is trodden in a state in which the engine clutch is released, a torque command of the motor is generated and the vehicle is controlled according to an intention of the driver, but the torque of the motor should not be generated when the torque command of the motor is 0 in a state in which the engine clutch is released, and accordingly, the speed of the motor has to be reduced by a frictional force or the like while not being increased. However, when a torque of the motor is generated in spite that the torque command of the motor is 0 in a state in which the engine clutch is released, an offset error of the resolver is generated, and this is a process of recognizing the offset error.

Thereafter, when the engine clutch is released and the torque command of the motor is 0, the resolver offset correcting apparatus 160 calculates a change value of the speed of the motor (S240) and determines whether the change value of the speed of the motor is 0 or more (S250). That is, when the engine clutch is released and the torque command of the motor is 0, the speed of the motor has to gradually decrease, and because the change value of the speed of the motor of not less than 0 means that the speed of the motor increases, there is no room for the divergence of the speed of the motor.

Accordingly, the resolver offset correcting apparatus 160 calculates a resolver offset change value by using a resolver offset change graph for the change of the speed of the motor (S260). A final resolver offset change value is calculated by adding an existing offset correction value set when an existing vehicle is mass-produced and the calculated resolver offset change value (S270).

Meanwhile, when the engine and the motor are not coupled to each other, the engine clutch is not released, or the torque command of the motor is not 0, or the change value of the speed of the motor is less than 0, the resolver offset correcting apparatus 160 maintains an existing offset correction value and corrects the offset of the resolver by using an existing offset correction value.

Table 5 represents a simulation result by the resolver offset correcting apparatus according to the present disclosure.

TABLE 5

| Item | Change of offset of resolver θerr 30 degrees | When improved logic is applied |
|---|---|---|
| Torque command [Nm] | | 0 |
| Motor speed [rpm] | | 4000 |
| Actual torque [Nm] | 6.7 | 0.3 |
| When clutch is released | Speed of motor diverges | Speed of motor does not diverge |

As in Table 5, it can be seen that divergence of the speed of the motor is not generated in spite that a difference between an actual torque and a torque command occurs because the actual torque is 0.3 when the torque command is 0 in the case in which the logic of the present disclosure is applied.

In this way, the present disclosure corrects the offset of the resolver by using the resolver offset correction value set when the vehicle is mass-produced, but the offset of the resolver may be corrected more accurately by detecting a resolver offset correction error even after the offset of the resolver is corrected by noise or the like, extracting a resolver offset change value according to a change value of the speed of the motor, and correcting an existing offset correction value.

Further, the present disclosure is made to solve problems of diverging the speed of the motor at a time point at which the engine clutch is released while the vehicle travels in a state in which the engine and the motor are coupled to each other, and an offset of the resolver is corrected by monitoring whether the engine clutch is released, extracting a resolver offset change value by using a change value of the speed of the motor when the torque command is 0 in a state in which the engine clutch is released, and applying the extracted resolver offset change value.

Figure 14:
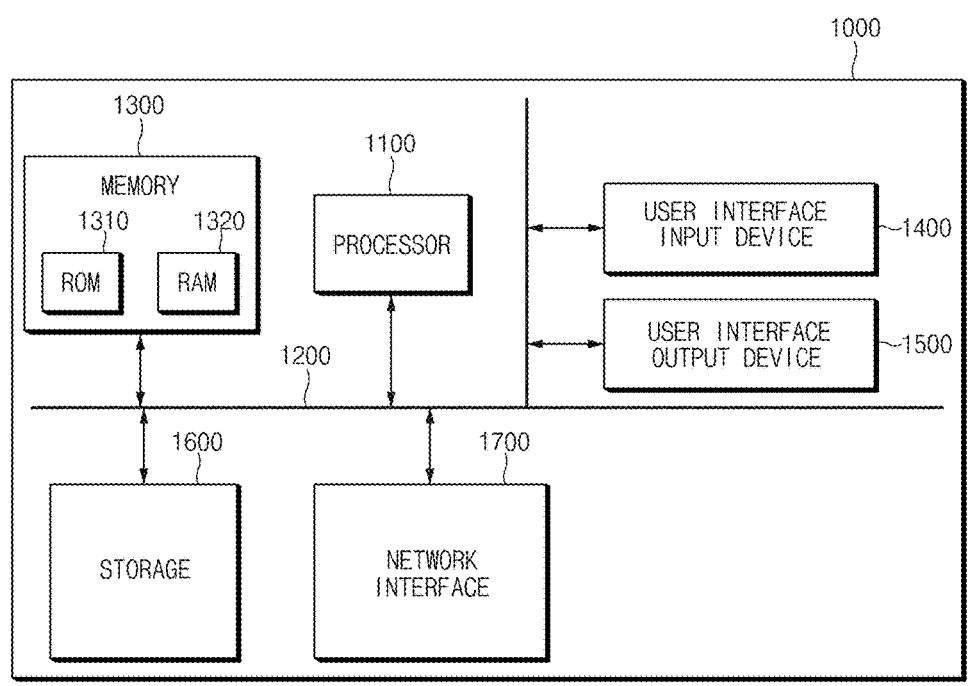
FIG. 14 is a diagram illustrating a computer system, to which a method for preventing divergence of a speed of a motor is applied, according to an embodiment of the present disclosure.

FIG. 14 is a diagram illustrating a computer system, to which a method for preventing divergence of a speed of a motor is applied, according to an embodiment of the present disclosure.

Referring to FIG. 14, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM.

The exemplary storage medium is coupled to the processor 1100, and the processor 1100 may read information from the storage medium and may write information in the storage medium In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The present technology may prevent divergence of the speed of a motor by detecting a resolver offset correction error in real time during driving of a vehicle and correcting a resolve offset again, thereby preventing damage of the motor. The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for correcting an offset of a resolver, the apparatus comprising:
    a resolver offset correcting error determining unit configured to determine whether a resolver offset correction error occurs, by determining whether an engine clutch is released and a torque command of a motor;
    a motor speed change value calculating unit configured to, if it is determined that the resolver offset correction error occurs, calculate a change value of a speed of the motor; and
    a control unit configured to extract a resolver offset change value by using a resolve offset change value table for the change value of the speed of the motor.

2. The apparatus of claim 1, further comprising:
    a storage configured to store the resolver offset change value table according to the change of the speed of the motor in advance.

3. The apparatus of claim 1, wherein the resolver offset correction error determining unit determines the offset error after determining a coupling state of the engine and the motor and if it is determined that the engine and the motor is coupled to each other.

4. The apparatus of claim 1, wherein the resolver offset correction error determining unit determines that the resolver offset correction error exists when the engine clutch is released and the motor torque command is 0.

5. The apparatus of claim 1, wherein the control unit calculates a final resolver offset correction value by adding the resolver offset change value to a preset existing resolver offset correction value.

6. The apparatus of claim 1, wherein the control unit extracts the resolver offset changing value when the change value of the speed of the motor is 0 or more.

7. The apparatus of claim 6, wherein the control unit maintains the existing resolver offset correction value when the change value of the speed of the motor is less than 0 or the resolver offset correction error determining unit determines that there is no resolver offset correction error.

8. The apparatus of claim 1, wherein the motor speed change value calculating unit calculates the change value of the speed of the motor speed by using a torque of the motor, a frictional coefficient, a speed of the motor, and a rod torque.

9. A system for correcting an offset of a resolver, the system comprising:
    a resolver offset correcting apparatus configured to determine whether a resolver offset correction error occurs, by determining whether an engine clutch is released and a torque command of a motor, to if it is determined that the resolver offset correction error occurs, extract a resolver offset change value by using a change value of a speed of the motor, and to correct the offset of the resolver by using the extracted resolver offset change value;
    a coordinate converting unit configured to convert a voltage command of the motor to a 3-phase voltage by using the resolve offset change value;
    a PWM signal generating unit configured to generate a PWM signal by using the 3-phase voltage; and
    a PWM inverter configured to control driving of the motor by switching the motor by using the PWM signal.

10. The system of claim 9, wherein the resolver offset correcting apparatus includes:
    a resolver offset correcting error determining unit configured to determine whether a resolver offset correction error exists, by determining whether an engine clutch is released and a torque command of a motor;
    a motor speed change value calculating unit configured to, if it is determined that the resolver offset correction error occurs, calculate a change value of a speed of the motor;
    a control unit configured to extract a resolver offset change value by using a resolver offset change value table for the change of the speed of the motor; and
    a storage configured to store the resolver offset change value table according to the change of the speed of the motor in advance.

11. The system of claim 10, wherein the control unit calculates a final resolver offset correction value by adding the resolver offset change value to a preset existing resolver offset correction value.

12. The system of claim 10, wherein the control unit extracts the resolver offset changing value when the change value of the speed of the motor is 0 or more.

13. The system of claim 12, wherein the control unit maintains the existing resolver offset correction value when the change value of the speed of the motor is less than 0 or the resolver offset correction error determining unit determines that there is no resolver offset correction error.

14. The system of claim 11, wherein the coordinate converting unit outputs the 3-phase voltage by using the final resolver offset correction value.

15. The system of claim 10, further comprising:
a current command generating unit configured to receive a torque command and an inverse magnetic flux to calculate d-axis and q-axis current commands of the motor; and
a current controller configured to output the voltage command by using the current command.

16. A method for correcting an offset of a resolver, the method comprising:
determining whether a resolver offset correction error exists, by determining whether an engine clutch is released and a torque command of a motor;
if it is determined that the resolver offset correction error occurs, calculating a change value of a speed of the motor; and
extracting a resolver offset change value by using a resolve offset change value table for the change of the speed of the motor.

17. The method of claim 16, wherein the determining of whether the resolver offset correction error occurs includes:
determining that the resolver offset correction error exists when the engine clutch is released and the motor torque command is 0.

18. The method of claim 16, further comprising:
calculating a final resolver offset correction value by adding the resolver offset change value to a preset existing resolver offset correction value.

19. The method of claim 18, further comprising:
correcting the resolver correction error by using the final resolver offset correction value.

20. The method of claim 18, further comprising:
maintaining the existing resolver offset correction value when the change value of the speed of the motor is less than 0 or a resolver offset correction error determining unit determines that there is no resolver offset correction error.

* * * * *